United States Patent [19]
Altenburger

[11] 3,992,592
[45] Nov. 16, 1976

[54] SCANNER-MARKER ARRANGEMENT FOR TELEPHONE SYSTEM
[75] Inventor: Otto Altenburger, Rochester, N.Y.
[73] Assignee: Stromberg-Carlson Corporation, Rochester, N.Y.
[22] Filed: Oct. 23, 1975
[21] Appl. No.: 625,057

[52] U.S. Cl. ............................................. 179/18 FF
[51] Int. Cl.² ........................................... H04M 3/22
[58] Field of Search ....... 179/18 FF, 18 AH, 18 FG, 179/18 AB, 18 E, 18 FH, 18 H; 340/147 LP

[56] References Cited
UNITED STATES PATENTS
3,699,263  10/1972  Neumeier et al. ............... 179/18 FF
3,705,268  12/1972  Altenburger ...................... 179/18 E
3,876,885   4/1975  Catterall ........................ 340/147 LP

Primary Examiner—Thomas A. Robinson
Attorney, Agent, or Firm—Donald R. Antonelli; William F. Porter, Jr.

[57] ABSTRACT

A scanner arrangement for scanning both line circuits and incoming trunk circuits simultaneously in groups with priority being given to the scanning of incoming trunk circuits. A sequencing means provides for individual scanning of line circuits of respective groups in which a possible request for service exists and the priority for trunk circuits is effected by inhibiting this sequencing and immediately scanning a selected group of trunk circuits.

14 Claims, 4 Drawing Figures

SCANNER-MARKER ARRANGEMENT FOR TELEPHONE SYSTEM

The present invention relates in general to automatic telephone systems, and more particularly to improvements in a line scanner and marker for an electronic telephone system.

In U.S. Pat. No. 3,699,263, issued Oct. 17, 1972, in the names of Gunter F. Neumeier and Otto Altenburger, there is disclosed a line scanner and marker arrangement which scans lines continuously in groups rather than on a line-by-line basis so as to reduce the scanning cycle time while still servicing lines on as rapid or more rapid a basis than prior line-by-line scanning systems. By reducing the individual line rate of scan through scanning of the line circuits in groups, the line scanner and marker arrangement of this patent requires scanning equipment which is less critical and therefore less expensive without sacrificing reliability or reducing the cycle time of the scanning operation.

The present invention provides further improvements in line scanner and marker arrangements of the type disclosed in the aforementioned Neumeier, et al, patent, and consists generally of a scanner and marker arrangement which is capable of scanning both line circuits and incoming trunk circuits. In this way, only a single scanner and marker arrangement is required in the telephone system, thereby materially simplifying the common equipment which is required to control the system and, in turn, reducing the costs and complexity of the system.

It is a general object of the present invention to provide a scanner and marker arrangement for a common control telephone system which is capable of scanning and marking both line circuits and incoming trunk circuits.

It is a further object of the present invention to provide a scanner and marker arrangement of the type described in which priority is given to the requests received from incoming trunk circuits so that calls received through incoming trunk circuits are processed prior to originating calls within the system.

A further object of the present invention is to provide a scanner and marker arrangement of the type described which combines the functions previously performed by the line scanner-marker and trunk scanner-marker circuits of a common control telephone system.

Still a further object of the present invention is the provision of a scanner and marker arrangement for a common control telephone system which requires less equipment, and is thereby less costly and more reliable in operation.

In accordance with the present invention, a scanner and marker arrangement is provided which scans the line circuits and incoming trunk circuits of the system in multiple groups simultaneously until a request for service is detected, at which time the individual line circuits and trunk circuits of selected groups are scanned separately to detect the individual line circuit or trunk circuit requesting service. A feature of the present invention resides in the provision of control circuitry which gives priority to requests from trunk circuits, so that an indication from a trunk group of a request for service will immediately inhibit scanning of the groups of line circuits to permit immediate service to be given to the trunk group.

These and other objects, features, and advantages of the present invention will become more apparent from the following detailed description thereof when taken in conjunction with the accompanying drawings, which illustrate one specific embodiment of the present invention, and wherein:

GENERAL SYSTEM DESCRIPTION

Figure 1:
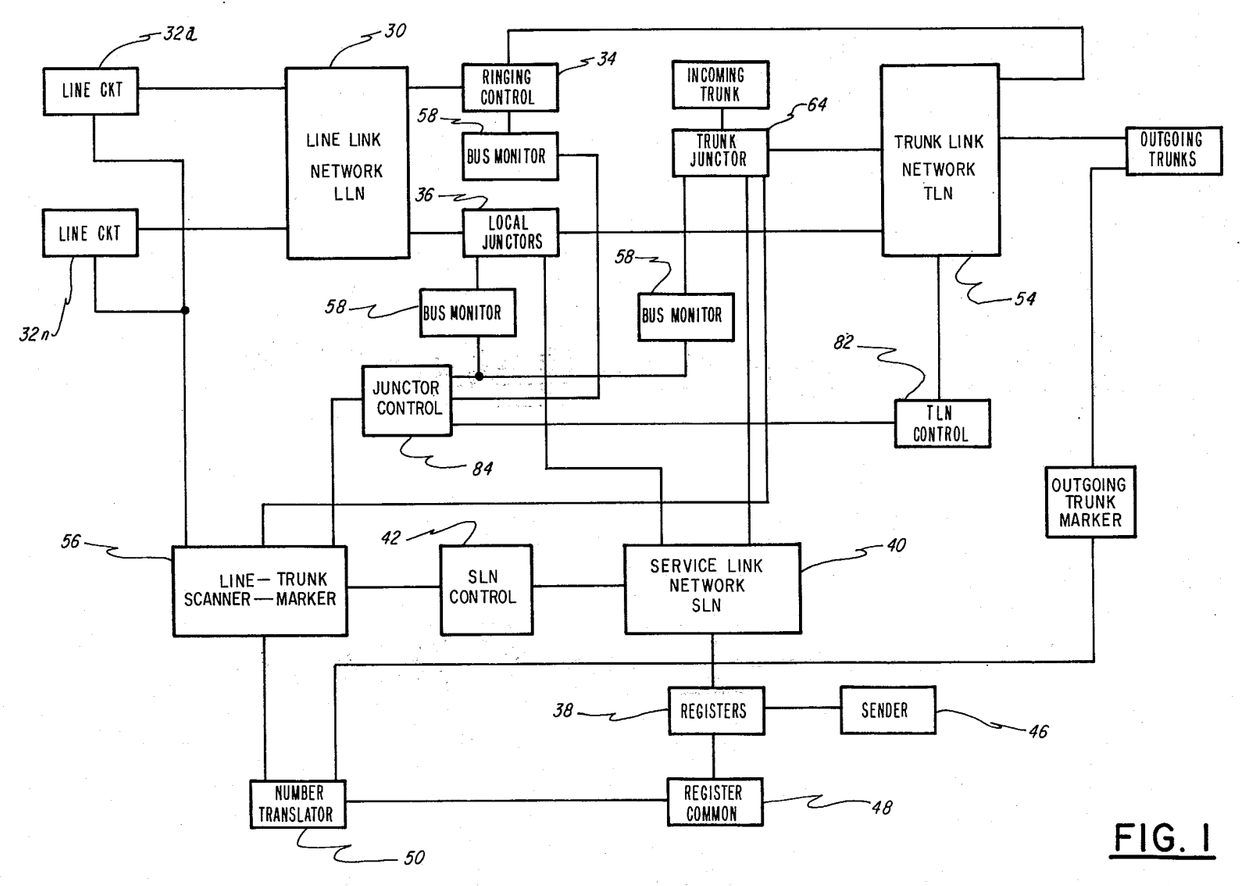
FIG. 1 is a basic block diagram of a telephone system including the scanner and marker arrangement of the present invention.

FIG. 1 of the drawing illustrates a basic block diagram of a telephone system including a plurality of line circuits 32a through 32n connected to a multistage line link network (LLN) 30, the final stage of which provides terminations to the local junctors 36 in the case of originating traffic and to the ringing controls 34 for terminating traffic. The number of local junctors and ringing controls provided depends upon the traffic requirements for the system.

The local junctors 36, which may be of the type disclosed in the U.S. Pat. No. 3,705,268 to Otto Altenburger, include provisions for connecting the line circuits to local registers 38 through a service link network 40 under the control of a service link network control 42. The registers 38, which serve to detect dialing information and other subscriber signals from the line circuits, basically consist of a dial pulse acceptor, register storage, and register output and can be connected to a sender 46 for providing outpulsing in connection with outgoing trunk calls. The registers 38 and senders 46 are controlled with outgoing trunk calls. The registers 38 and senders 46 are controlled by a register common 48, which is in turn connected to a number-code translator 50 providing information concerning equipment numbers, ringing codes, and class of service information.

The line-trunk scanner-marker 56, which comprises the present invention, serves to simultaneously scan the line circuits and incoming trunk circuits in groups to detect request for service in the manner to be described in more detail hereinafter, and is used for both originating and terminating types of functions. When the circuit 56, which continuously scans the line circuits 32a through 32n and the trunk junctors 64 detects a service request in the form of an off-hook condition, it marks the line or trunk requesting service and actuates the service link network control 42 to start the path finding from an available register 38 to the marked line circuit or trunk.

In the case of locally generated calls, the service link network control 42 seeks out a path from the register 38 through the service link network 40, a local junctor 36, and the line link network 30 to the marked line circuit. Dial tone is then applied to the line circuit from the register 38, notifying the subscriber that he may commence dialing the line number of the called party.

The dialed information is received from the calling subscriber line in the register 38, which determines from the translator 50 whether the call is to be a local call or a trunk call. In the case of a local call, the number of the called party is translated to an equipment number in the translator 50 and the circuit 56 marks the called line in accordance with the equipment number received from the translator 50. At this time, a switch-through signal is forwarded from the local register 38 through the local junctor 36 signalling the junctor to seize the junctor control 84 to effect termination of the call to the marked called line circuit.

In the case of an incoming trunk call, the incoming trunk is connected through the trunk junctor 64 and service link network 40 to the register, which then receives the dialed information which is outpulsed from the distant central office.

In terminating a call within the system, the junctor control 84 actuates the trunk link network control 82 to start the path finding operation through the trunk link network 54 from the local junctor 36 or trunk junctor 64 to the marked terminating line circuit. The ringing code for the called subscriber is forwarded from the translator 50 through the scanner-marker circuit 56 and the junctor control 84 to the ringing control 34. As soon as the junctor control 84 determines that the connection from the junctor 36 through the trunk line network 54, ringing control 34 and line link network 30 to the line circuit has been completed, it will signal the local junctor or trunk junctor preparing the junctor for switch-through between the parties upon receipt of answer supervision, and the junctor will then release the junctor control in response to this signal.

In prior systems, such as disclosed in the aforementioned U.S. Pat. No. 3,699,263 to Neumeier, et al, the scanning and marking of line circuits and incoming trunk circuits was performed by separate line scanner-marker and trunk scanner-marker arrangements. The present invention therefore simplifies the telephone system by providing a single scanner-marker arrangement for scanning and marking both line circuits and incoming trunk circuits.

DETAILED DESCRIPTION OF THE SCANNER AND MARKER ARRANGEMENT

Figure 2:
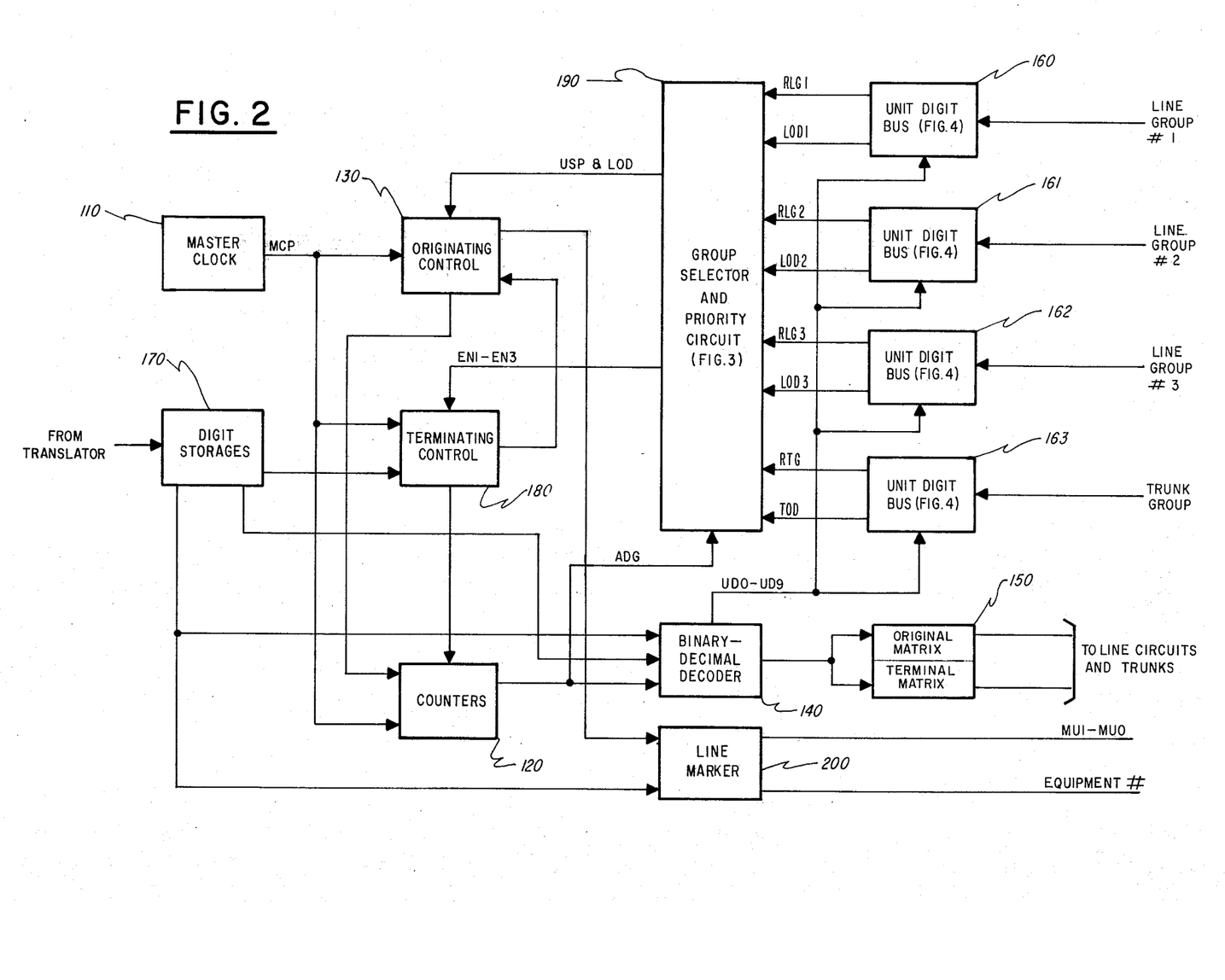
FIG. 2 is a block diagram of the scanner and marker arrangement of the present invention.

FIG. 2 provides a schematic block diagram of the scanner and marker arrangement of the present invention. The scanner operates from a master clock supplying a master clock pulse MCP, which is used to operate the decimal counters 120 for purposes of effecting scanning of the line circuit and also forms the basis for the generation of time slot signals which are used to control the various operations performed by the scanner in proper sequence.

The counters 120, driven from the master clock 110 under control of the originating control 130, sequentially generate a binary count which is converted to sequential decimal values by the binary-to-decimal decoder 140, the output of which is applied to a matrix 150 which selectively marks sequential groups of line circuits and incoming trunk circuits with a mark potential in accordance with the numerical output provided from the decoder 140. In this regard, all of the line circuits and incoming trunk circuits in the system are divided up into groups and subgroups with each output of the matrix 150 being connected in common to a corresponding subgroup of each group of line circuits and incoming trunk circuits. Thus, as each output of the originating matrix 150 is enabled, a mark potential will be applied in common to a corresponding subgroup of each group of line circuits and incoming trunk circuits.

When a request for service is detected, the mark potential applied to a subgroup of line circuits or incoming trunk circuits is returned to one of the unit digit buses 160, 161, 162, and 163, depending upon which group of line circuits or trunk circuits produce the request for service. The unit digit bus which receives this service request signals the counters 120 via the originating control 130 to stop the scanning of the groups of line circuits and trunk circuits on the subgroups presently being scanned, and the originating control 130 then effects a scanning of the individual lines and trunks of these subgroups in common via the counters 120.

In accordance with the present invention, there is provided a group selector and priority circuit 190 which selectively analyzes the data received from the unit digit buses 160, 161, 162, and 163 and provides control outputs to the originating control 130 in response thereto. As the individual lines and trunks of selected subgroups are scanned after receipt of a request for service from one of the groups of line circuits and incoming trunk circuits, the group selector and priority circuit 190 enables the outputs of one of the unit digit buses 160 – 163 at a time as the counters 120 scan through the individual lines and trunks of the subgroups. Each time the counters 120 scan through one complete cycle of a subgroup, a signal ADG is forwarded to the group selection and priority circuit 190 to enable the outputs of the next unit digit bus in the sequence until an output is received from one of the unit digit buses indicating detection of the line circuit or trunk circuit which is requesting service. The group selector and priority circuit 190 then signals the originating control 130 to stop the counters 120.

The equipment number of the selected line represented by the state of the stopped counters 120 is then shifted from the digit storage 170 to the line marker 200, which in turn transfers the equipment number to the registers for use in connection with other operations. The originating control 130 also signals the line marker 200 to extend a mark to the selected line circuit so that path finding between the line circuit and an available register can be carried out under control of the junctor control and service link network control.

For terminating connections from a junctor or incoming trunk circuit to a called line circuit, the counters 120 are inhibited by the terminating control 180 and the equipment number of the line circuit is received from the number translator 50 and inserted into the digit storage 170. This equipment number is then transferred from the digit storage 170 through the binary-to-decimal decoder 140 through the matrix 150 which provides outputs marking the selected line circuit. At the same time, the terminating control 180 signals the line marker 200 so that a mark may be applied through the line circuit to the input of the line link network permitting path finding from the marked junctor through the trunk link network to the marked line circuit. The terminating control also controls the terminating to PBX lines, requesting repeated equipment numbers from the number translator 50 until an available line to the PBX is found.

The details of the originating control 130, digit storage 170, terminating control 180, as well as the combination of counters 120, binary-to-decimal decoder 140, matrix 150, and line marker 200, are fully disclosed in the aforementioned U.S. Pat. No. 3,699,263. The marking of the line circuits for both originating and terminating connection is accomplished in the same manner as described in this prior patent, and the marking of incoming trunk circuits is also accomplished in a similar manner. However, the present invention provides the additional advantage of combining the scanning and marking of trunk circuits and line circuits to a single arrangement which serves to scan such circuits in groups and subgroups simultaneously until a request for service is detected from one of the plurality of subgroups being scanned at a given time. Subsequent operation provides for individual scanning of the respective subgroups under the control of the group selector and priority circuit 190, with priority being given to the scanning of the trunk groups and subgroups thereof in a manner to be described hereinafter.

The present invention makes possible the scanning and marking of many groups of both line circuits and trunk circuits. However, to facilitate the description of the present invention, the exemplary embodiment which is disclosed herein provides for the scanning and marking of three line groups of line circuits and one trunk group of trunk circuits. More or less line groups, and certainly more trunk groups, may be controlled by the line scanner and marker arrangement of the present invention, as will be obvious from the detailed description of the present invention.

In this regard, as seen in FIG. 2, the unit digit buses 160, 161, and 162 are assigned to respective line groups while the unit digit bus 163 is assigned to a trunk group. To accommodate additional line groups or trunk groups, additional unit digit buses ae provided, with a single unit digit bus being provided for each group of such circuits. As already described in the aforementioned U.S. Pat. No. 3,699,263, the individual groups of circuits to be scanned preferably are divided into subgroups of ten circuits each, with each group of circuits including up to one hundred subgroups.

The basic scanning of the subgroups in each group in parallel is carried out in the manner similar to that described in the aforementioned U.S. Pat. No. 3,699,263 with the outputs of a tens counter and hundreds counter being converted in the binary-to-decimal decoder 140 and applied to the originating matrix 150 producing an output for each subgroup of each group, corresponding subgroups of each group being connected in common to a single output of the originating matrix 150. Thus, if a request for service is detected in any subgroup of the plural groups of circuits in the system, the mark potential applied to the subgroup will be returned to the particular unit digit bus associated with that group of circuits.

At this point, the state of the tens counter and the hundreds counter will indicate a particular subgroup identification in which the service request originated but will not indicate from which group the service request is received nor the particular circuit within that subgroup which originated the request. However, the output from the unit digit bus will be applied through the group selector and priority circuit 190 to the originating control as a signal LOD causing the tens counter and hundreds counter to stop to preserve the identity of the subgroup. At the same time, the originating control 130 initiates operation of a units counter in the counters 120 to sequentially scan the circuits of the designated subgroup of each group.

In this regard, the ten circuits in each subgroup, the units counter will sequentially scan the first circuit in each subgroup, then the next circuit in each subgroup, and so on. At the same time, the group selector and priority circuit 190 will enable only the output from the unit digit bus 160, so that while all of the circuits of the selected subgroups of each of the groups are scanned in sequence, the group selector and priority circuit 190 will monitor the scanning of only one group at a time.

If in the first complete scan of the units counter the service request is not detected at the output of unit digit bus 160 by way of a signal RLG1, the units counter will forward a signal ADG to the group selector and priority circuit 190 to switch its monitoring to the outputs of the unit digit bus 161 for the second cycle of operation of the unit counter. If during the next complete cycle of operation of the unit counter the service request is not detected by receipt of the signal RLG2 in the group selection and priority circuit 190, the unit counter will again generate the signal ADG causing the circuit 190 to switch its monitoring to the output of unit digit bus 162. For reasons which will be explained hereinafter, the service request should then be certainly found in the third cycling of the units counter.

Obviously, if the service request is detected at the output of the unit digit bus 160 or the unit digit bus 161 at the time the outputs of these buses are being monitored by the group selection and priority circuit 190, the signal USP will be generated signalling the originating control 130 to stop the units counter. Further consideration of the other line group or groups is therefore unnecessary. The state of the counters 120 will then indicate the equipment number to the circuit requesting service and the group selection and priority circuit 190 will indicate which line group the service request was detected, thereby clearly identifying the particular circuit from which the service request originated.

Since it is necessary to give more prompt consideration to service requests received on incoming trunk circuits, priority should be given to the processing of such requests over originating requests from line circuits within the system. Thus, in the initial scanning of the subgroups of line circuits and incoming trunk circuits, when a service request is received from an incoming trunk circuit, detection of such a request in a subgroup of trunk circuits will result in the generation of the signal TOD, which is applied to the group selection and priority circuit 190. This signal not only causes generation of the signal LOD to the originating control 130 causing the tens counter and hundreds counter to stop and initiating operation of the units counter, but also is utilized in the group selection and priority circuit 190 to bypass the scanning of the unit digit buses 160 − 162 associated with line groups, thereby immediately picking up the monitoring of the output of the unit digit bus 163.

Figure 3:
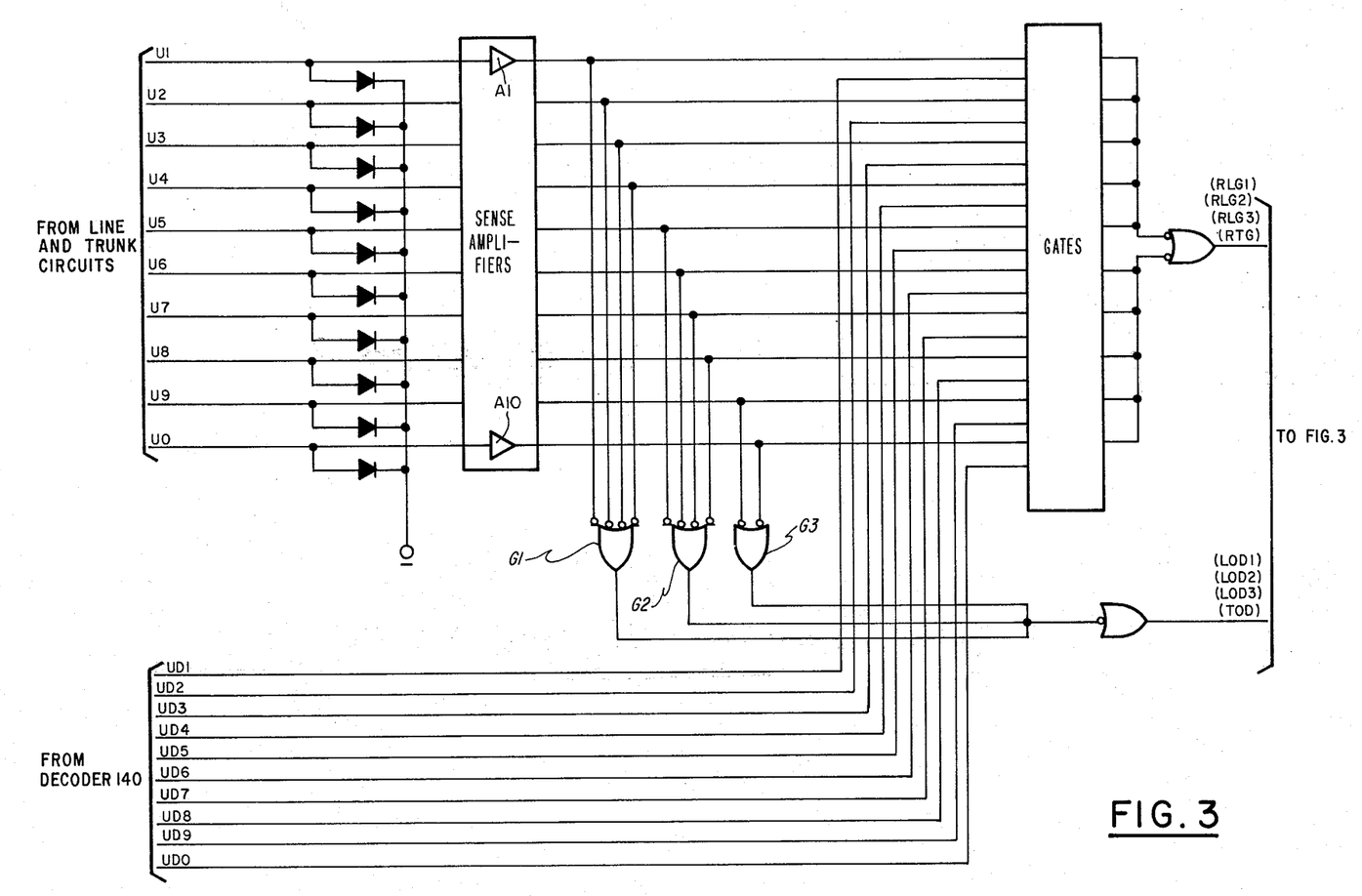
FIG. 3 is a schematic circuit diagram of a typical unit digit bus which may be used either with groups of line circuits or groups of trunk circuits.

FIG. 3 is a schematic ciccuit diagram of one example of a unit digit bus which may be utilized in connection with a group of line circuits or a group of trunk circuits. The inputs U0 through U9 of each unit digit bus are connected in common to the outputs of each subgroup of a particular group of line circuits or trunk circuits with which the unit digit bus is associated. The input to each subgroup of the group receives a ground mark from the output of the originating matrix 150 so that if the line or trunk relay in one of the circuit of the subgroup is operated indicating a service request, the ground mark will extend through into the unit digit bus causing current to flow to the negative potential which is connected to each of the input lines thereof through a respective diode. Thus, a particular input lead connected to the circuit requesting service will provide a ground indication which will produce a current capable of being detected by a respective one of the sense amplifiers A1 through A10 connected to the input lines.

If one or more of the amplifiers A1 through A10 provide an output in response to detection of a currrent on one or more of the leads U0 – U9, an output will be applied through one of the gates G1, G2, or G3, resulting in generation of one of the off-hook detect signals LOD1, LOD2, LOD3, or TOD, depending upon whether the unit digit bus is connected to the first, second, or third group of line circuits or to the group of trunk circuits. These off-hook detect signals are applied to the group selector and priority circuit 190 to proudce the off-hook detect signal LOD to the originating control 130. This stops the tens counter and hundreds counter and starts the units counter. The off-hook detect signal generated in the unit digit bus will be maintained since the tens counter and hundreds counter is stopped maintaining the ground mark at a particular subgroup containing the line circuit or trunk circuit requesting service.

When the units counter is started, the units outputs UD0 – UD9 are connected to the unit digit buses in common and will be used to scan sequentially the circuits of the corresponding set of subgroups of each group designated by the stopped tens counter and hundreds counter. These units outputs UD0–UD9 are ANDED with the incoming lines U0 – U9 in each unit digit bus. In this way, the ten circuits associated with each selected subgroup of the respective groups are scanned by the sequentially enabled outputs UD0 – UD9.

When a circuit from the scanned subgroups providing the ground mark is scanned, the particular unit digit bus will generate a signal RLG1, RLG2, RLG3, or RTG, depending upon the group which provides the service request. As seen in FIG. 2, these service detection signals are applied to the group selection and priority circuit 190.

Figure 4:
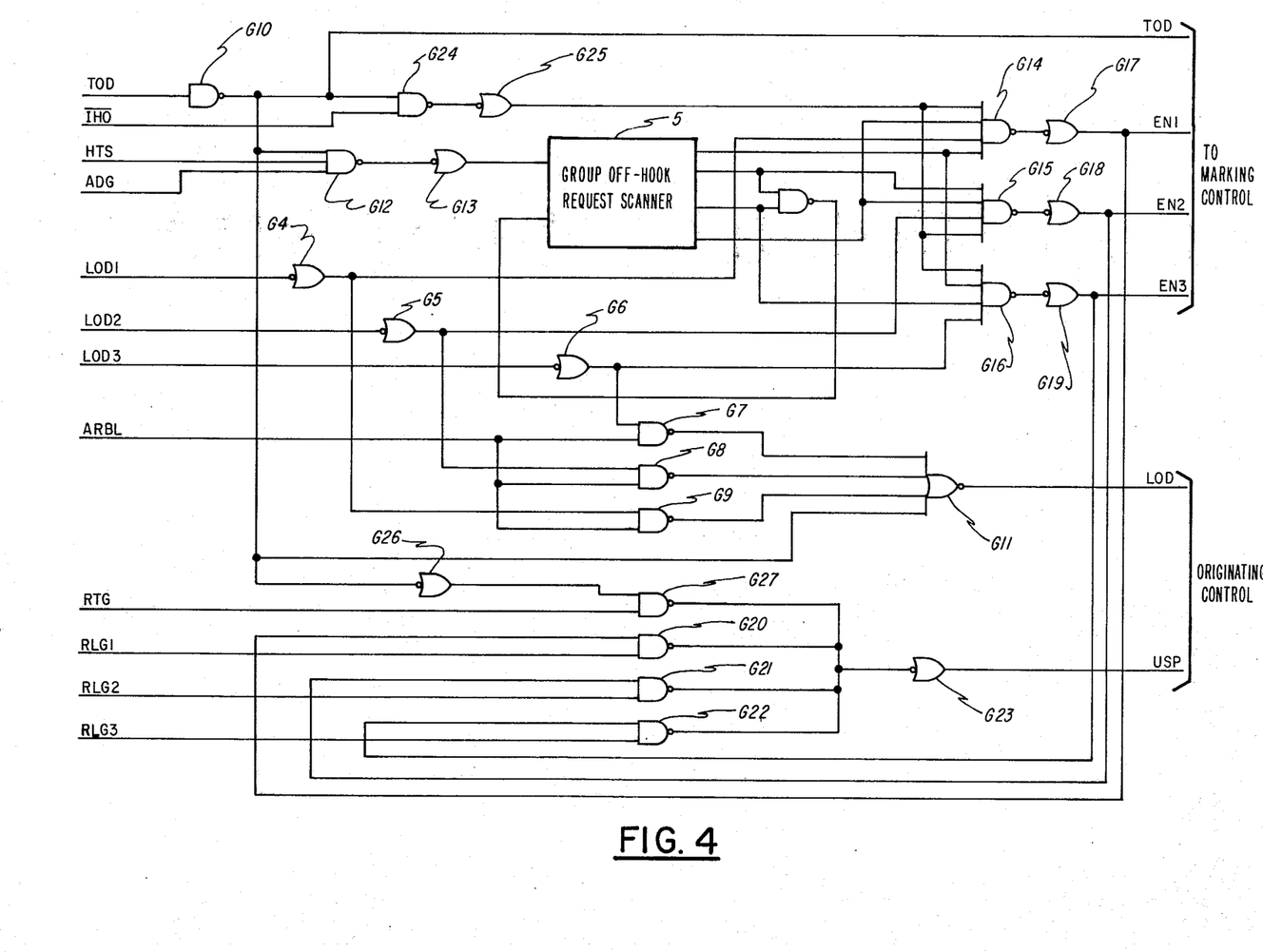
FIG. 4 is a schematic circuit diagram of the group selector and priority circuit.

FIG. 4 is a schematic circuit diagram of the group selection and priority circuit 190 which provides for the selective scanning of the outputs of the unit digit buses and also provides the priority control associated with the scanning of service requests in connection with incoming trunk circuits.

The first function performed by this circuit is to generate the off-hook detect signal LOD during the initial scanning of the subgroups of line circuits and trunk circuits to cause the originating control 130 to stop the tens counters and hundreds counter in the counters 120. This is accomplished by applying the signals LOD1, LOD2, and LOD3 from the unit digit buses 160 – 162 through gates G4, G5, and G6 to one respective input of each of the AND gates G7, G8, and G9. The other inputs to the AND gates G7 – G9 are connected to receive a signal ARBL from the common control at such time that the system detects that all registers or junctors in the system are busy, in which case the system cannot perform the originating connection.

In the absence of the signal ARBL, the gates G7 through G9 may be enabled by receipt of an off-hook detect signal from one of the unit digit buses. The trunk off-hook detect signal TOD from the unit digit bus 163 is received via gate G10 and applied directly to one input of the OR gate G11, the other input thereof being connected to the outputs of the AND gates G7 through G9. Thus, if any one of the signals LOD1, LOD2, LOD3, or TOD is generated from the output of one or more of the unit digit buses 160 – 163, the OR gate G11 will provide the off-hook detect signal LOD to the originating control 130. The manner in which the originating control 130 stops the tens counter and hundreds counter and initiates operation of the units counter is described in the aforementioned U.S. Pat. No. 3,699,263.

The group selection and priority circuit 190 includes a group off-hook request scanner S in the form of a two-stage binary counter, the outputs of which are connected to gates G14, G15, and G16, which decode the output of the scanner S to produce sequential output signals via gates G17, G18, and G19 on leads EN1, EN1, and EN3.

At the time the units counter is started by the originating control 130, the group off-hook request scanner S in the circuit 190 is reset, providing an output via gate G17 on lead EN1. The signal EN1 is applied to one input of an AND gate G20, the other input of which is connected to the output RLG1 of the unit digit bus 160. Thus, while all of the selected subgroups of each group designated by the state of the tens and hundreds counters are scanned in common, only the output of the unit digit bus 160 is monitored in the group selection and priority circuit 190 during the first cycle of the units counter. If the service request is provided from one of the line circuits included in the selected subgroup of the group connected to the unit digit bus 160, the signal RLG1 will be generated providing an output from gate G20 through gate G23 as signal USP to the originating control 130, which causes the units counter to stop in response thereto.

If the service request does not originate in the selected subgroup of the line group associated with the unit digit bus 160, the units counter will completely cycle without the signal RLG1 being generated. At the end of the cycling of the units counter, that counter will produce a signal ADG to one input of the gate G12 in FIG. 4, which gate receives at a second input the signal HTS indicating that the tens counter and hundreds counter have stopped. If an inhibit signal is not received on the third input of the gate G12 from the output of the gate G10, for reasons which will be explained more fully herinafter, an advance signal will be applied from the output of gate G12 through gate G13 to advance the state of the group off-hook request scanner S. As a result, the signal EN1 will disappear and the signal EN1 will be produced at the output of gate G18. This signal is then applied to one input of AND gate G21 which receives at its second input the output RLG2 from the unit digit bus 161.

The units counter then cycles once again, and if the service request originated from the subgroup of the line group associated with the unit digit bus 161, the signal RLG2 will be generated at the output of that unit digit bus and pass the gate G21 to produce the unit stop pulse signal USP at the output of the gate G23 to the originating control 130. In the same manner as already indicated, the originating control 130 would then stop the units counter in response to receipt of the signal USP.

If the signal RLG2 is not received from the output of the unit digit bus 161 during the second scanning or cycling of the units counter, at the end of the cycle the units counter will again generate the signal ADG applying the advance digit signal through the gate G13 once again to advance the count in the group off-hook request scanner S. As a result, the signal EN2 will disappear and the signal EN3 will be generated at the output of gate G19. This signal will be applied to one input of the AND gate G22, which is connected to receive at its second input the signal RLG3 at the output of unit digit bus 162. If the cycling has proceeded this far in the operation of the system, the service request should surely be found in the third cycling of the units counter so that an output will be provided from the gate G22 when the line circuit requesting service is scanned, producing the signal USP at the output of gate G23 to the originating control 130 to cause the units counter to stop.

Since it is desirable to give priority to service requests received from incoming trunk circuits, the system provides for an immediate consideration of the group of trunk circuits when a trunk off-hook detect signal is received from the unit digit bus 163. Thus, during the initial scanning of the subgroups of each group of circuits when a service request from an incoming trunk is detected which stops the operation of the tens counter and hundreds counter, the signal TOD will be applied through the gate G10 to one input of an AND gate G24. If no signal $\overline{IH0}$ is received from the common control indicating that operation of the system should be inhibited, the gate G24 will be applied through gate G25 to a respective input of each of the gates G14, G15, and G16 to inhibit operation of these gates. Under such conditions, none of the signals EN1, EN2, or EN3 can be generated. In addition, the output of gate G10 is applied to one input of the gate G12, as already indicated, to inhibit this gate and inhibit operation of the group off-hook request scanner S. Also, the output of the gate G10 is applied through a gate G26 to one input of an AND gate G27, preparing this gate for operation.

During the first cycling of the units counter, each of the selected subgroups of each group will be scanned from the output of the units counter, including the subgroups of line circuits; however, as can be seen in FIG. 4, the group selection and priority circuit 190 will enable only the output of the unit digit bus 163 so only the condition of the trunk circuits in the selected subgroup thereof will be monitored. When the trunk circuit providing the service request is scanned by the units counter, the signal RTG will be generated and applied to the second input of the AND gate G27 to enable that gate. The output from the gate G27 will be applied through OR gate G23 to produce the signal USP to the originating control 130 causing the units counter to stop.

In each case described herein, once the units counter is stopped, the state of the units counter, tens counter and hundreds counter will provide a direct indication of the equipment number of the line circuit or trunk circuit from which the service request originated. To determine in which group the line circuit or trunk circuit is located, the signal TOD, EN1, EN2, and EN3 are forwarded to a marking control (not shown) which aids in the marking of the proper group.

While the present invention has been described in conjunction with a particular automatic telephone system, it should be apparent that other systems can be equally served by the scanner and marker arrangement described herein. Thus, it is to be clearly understood that this description is to be taken only by way of example and not as a limitation on the scope of the invention.

What is claimed is:

1. In an automatic telephone system for effecting communication connections between selected ones of a plurality of telephone circuits, including line circuits and trunk circuits, a scanner arrangement comprising
   group scanning means for successively generating a scanning signal on respective scanning lines, each scanning line being connected in common to a corresponding group of line circuits and trunk circuits in respective sets of groups of such circuits and extending in common to each of the line circuits and trunk circuits of the respective groups to which they are connected,
   a plurality of unit digit means each associated with a respective set of groups of line circuits and trunk circuits and each providing a plurality of unit digit lines each connected in common to a corresponding line circuit or trunk circuit of each group of the set for detecting a scanning signal on any one of the unit digit lines associated therewith,
   unit scanning means connected to the unit digit lines of each of said unit digit means for simultaneously scanning the unit digit lines to detect a scanning signal on one of said unit digit lines,
   control means responsive to detection of a scanning signal on a unit digit line of one of said unit digit means for inhibiting further operation of said group scanning means and actuating said unit scanning means,
   detecting means responsive to detection of a scanning signal from a unit digit means scanned by said unit scanning means for stopping said unit scanning means, and
   selection means responsive to said unit scanning means for sequentially connecting each unit digit means in turn to said detecting means each time said unit scanning means completes a scanning cycle.

2. A scanner arrangement as defined in claim 1, further including service requesting means in each line circuit and trunk circuit for connecting the group scanning line to the unit digit line of the associated unit digit means through the line circuit or trunk circuit in response to a request for service.

3. A scanner arrangement as defined in claim 1 wherein each of said sets of groups of line circuits and trunk circuits consists of either all line circuits or all trunk circuits so as to provide sets of groups of line circuits and at least one set of groups of trunk circuits.

4. A scanner arrangement as defined in claim 3 wherein each of said unit digit means includes sensing means for detecting a scanning signal on one of said unit digit lines and actuating means responsive to said sensing means for generating a trunk or line demand signal to actuate said control means.

5. A scanner arrangement as defined in claim 4 wherein said selection means includes priority means responsive to a trunk demand signal from the unit digit means associated with said set of groups of trunk circuits for connecting only that unit digit means to said detecting means.

6. A scanner arrangement as defined in claim 4 wherein said selection means includes sequencing means for generating a sequence of enabling signals in response to the cycling of said unit scanning means and gating means for gating said sequentially received enabling signals with the outputs of the actuating means in the respective unit digit means associated with sets of groups of line circuits.

7. A scanner arrangment as defined in claim 6 wherein said selection means further includes priority means resonsive to a trunk demand signal from the unit digit means associated with said set of groups of trunk circuits for disabling said sequencing means and said gating means.

8. A scanner arrangement as defined in claim 7 wherein said priority means includes a plural stage binary counter which is advanced by one scanning signal of said unit scanning means.

9. In an automatic telephone system for effecting communication connections between selected ones of a plurality of telephone circuits, including line circuits and trunk circuits, a scanner arrangement comprising
  group scanning means for successively generating a group scanning signal on respective scanning lines, each scanning line being connected in common to a corresponding group of line circuits and trunk circuits in respective sets of groups of such circuits and extending in common to each of the line circuits and trunk circuits of the respective groups to which they are connected,
  a plurality of unit digit means each associated with a respective set of groups of line circuits and trunk circuits and including a plurality of unit digit lines each connected in common to a corresponding circuit of each group of the set and means for detecting a group scanning signal passing any one of said circuits associated therewith to a unit digit line therein and generating a group scanning inhibit signal in response thereto,
  unit scanning means connected to the unit digit lines of each of said unit digit means for simultaneously scanning the unit digit lines and generating a unit scanning inhibit signal upon detection of a group scanning signal on one of said unit digit lines,
  first control means responsive to a group scanning inhibit signal for inhibiting further operation of said group scanning means and actuating said unit scanning means and second control means responsive to a unit scanning inhibit signal for inhibiting further operation of said unit scanning means, and
  selection means responsive to said unit scanning means for sequentially connecting each unit digit means in turn to said second control means each time said unit scanning means completes a scanning cycle.

10. A scanner arrangement as defined in claim 9, further including service requesting means in each line circuit and trunk circuit for connecting the group scanning line to the unit digit line of the associated unit digit means through the line circuit or trunk circuit in response to a request for service.

11. A scanner arrangement as defined in claim 9 wherein said sets of groups of line circuits and trunk circuits consists of sets of groups of line circuits and at least one set of group of trunk circuits.

12. A scanner arrangement as defined in claim 11 wherein said selection means includes priority means responsive to a group scanning inhibit signal from the unit digit means associated with said set of groups of trunk circuits for connecting said second control means to that unit digit means while bypassing the sequenced connection thereof to all unit digit means associated with sets of groups of line circuits.

13. A scanner arrangment as defined in claim 11 wherein said selection means includes sequencing means for generating a sequence of enabling signals in response to the cycling of said unit scanning means and gating means for gating said sequentially received enabling signals with the unit scanning inhibit signal in the respective unit digit means associated with sets of groups of line circuits.

14. A scanner arrangement as defined in claim 13 wherein said selection means further includes priority means responsive to a group scanning inhibit signal from the unit digit means associated with said set of groups of trunk circuits for disabling said sequencing means and said gating means.

* * * * *